Feb. 26, 1957 W. F. STEAGALL 2,783,456
PHASE RESPONSIVE BISTABLE DEVICES
Filed Oct. 1, 1954 5 Sheets-Sheet 1
FIG. 1.
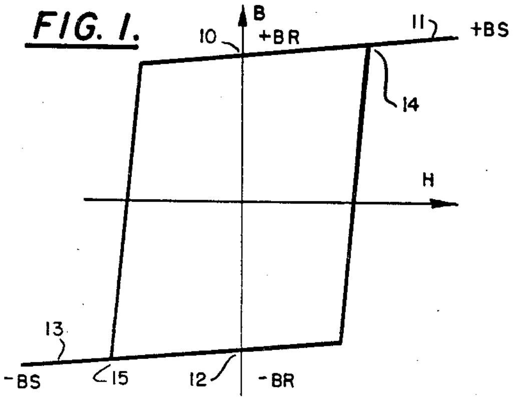
FIG. 2. FIG. 4.
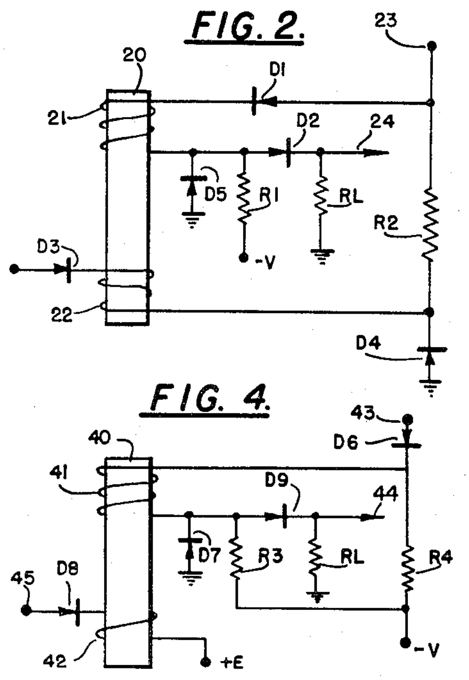
FIG. 3.
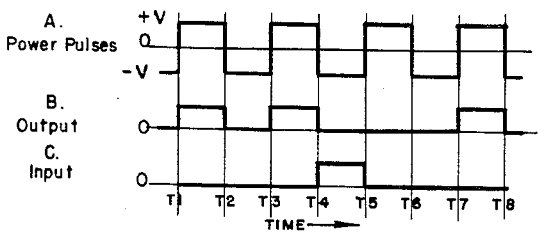
FIG. 5.
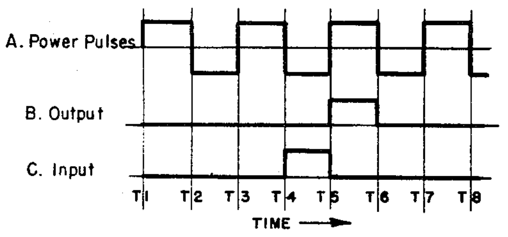
FIG. 6.
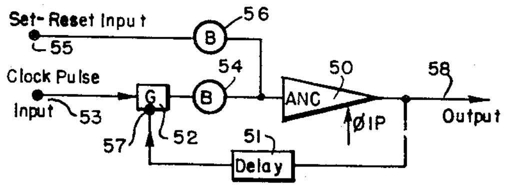
LEGEND
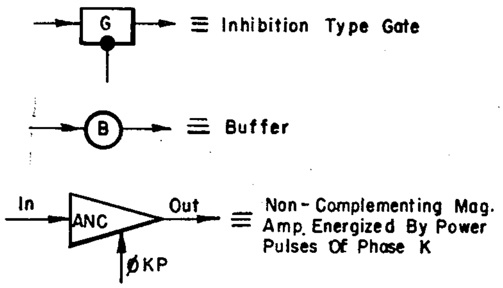
INVENTOR
WILLIAM F. STEAGALL
BY [signature]
ATTORNEY Feb. 26, 1957 W. F. STEAGALL 2,783,456
PHASE RESPONSIVE BISTABLE DEVICES
Filed Oct. 1, 1954 5 Sheets-Sheet 2
FIG. 7.
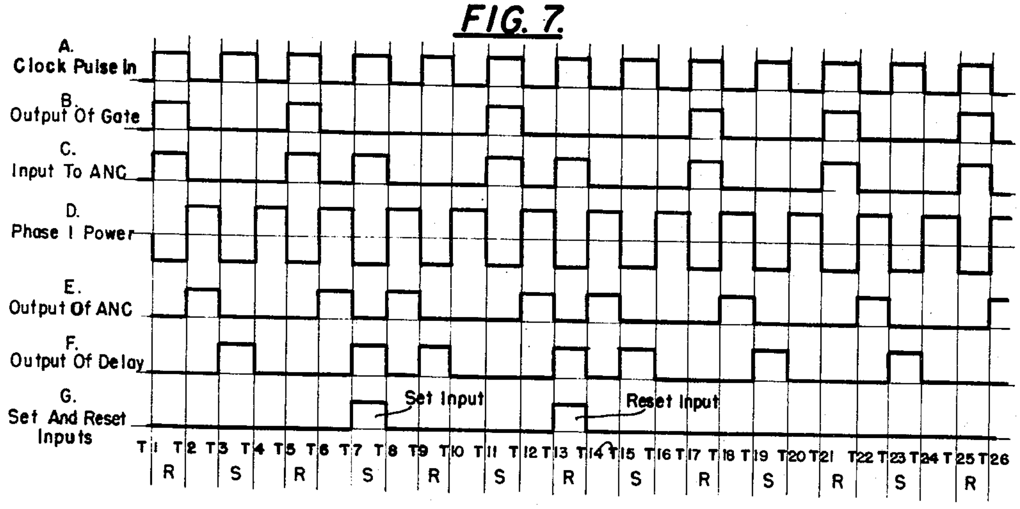
FIG. 10.
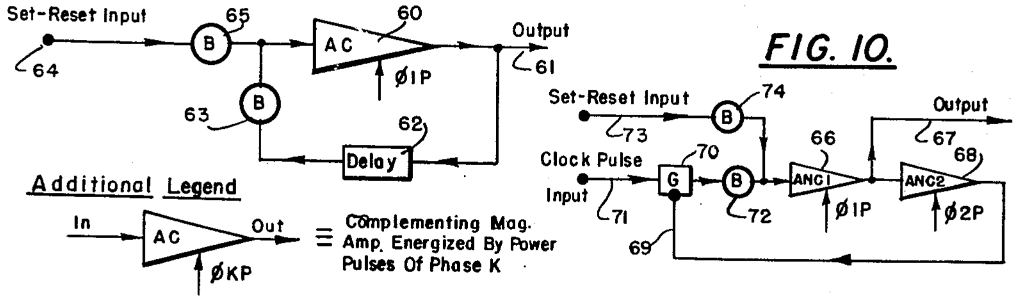
FIG. 8.
FIG. 9.
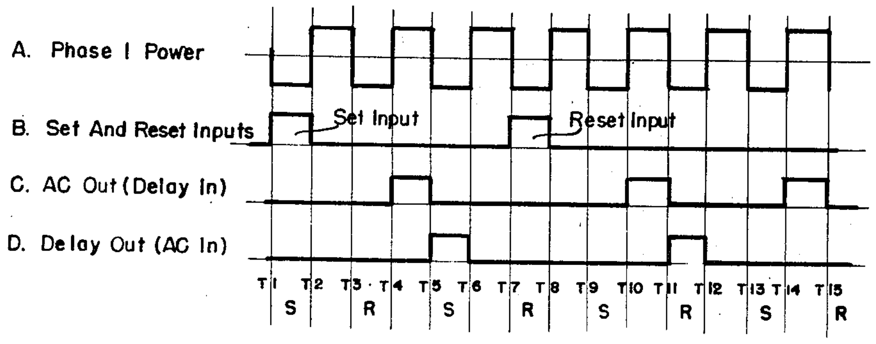
INVENTOR
WILLIAM F. STEAGALL
BY Efferry Light
ATTORNEY

INVENTOR

WILLIAM F. STEAGALL

BY Jerry Light

ATTORNEY

INVENTOR
WILLIAM F. STEAGALL
BY [signature]
ATTORNEY

Feb. 26, 1957 W. F. STEAGALL 2,783,456
PHASE RESPONSIVE BISTABLE DEVICES
Filed Oct. 1, 1954 5 Sheets-Sheet 5

INVENTOR
WILLIAM F. STEAGALL
BY [signature]
ATTORNEY

United States Patent Office 2,783,456
Patented Feb. 26, 1957

2,783,456

PHASE RESPONSIVE BISTABLE DEVICES

William F. Steagall, Merchantville, N. J., assignor, by mesne assignments, to Sperry Rand Corporation, New York, N. Y., a corporation of Delaware Application October 1, 1954, Serial No. 459,630

14 Claims. (Cl. 340—174)

The present invention relates to bistable devices and is more particularly concerned with such devices comprising magnetic amplifiers. In particular, the present invention is concerned with bistable devices responsive to inputs of differing phases to give outputs of further differing and characteristic phases.

Bistable devices, of course, are one of the basic circuits utilized in many present-day electronic and electrical applications, notably in computing applications. Such devices are sometimes termed flip-flops and also, depending upon their precise construction and operation, may be utilized as counter devices. In general, such bistable devices are characterized by the fact that the device itself is responsive to pulse or signal inputs to give one of two characteristic outputs. In general, the usual bistable device has two stable states distinguished respectively by a difference in potential at one or more points in the circuit. It often occurs, however, that a circuit is desired which does not give differing potentials as the characteristic outputs thereof, but which gives pulse outputs differing in a predetermined manner in phase with respect to some arbitrary datum. It is with this latter type of circuit that the present invention is primarily concerned.

It is accordingly an object of the present invention to provide novel phase responsive bistable devices utilizing magnetic amplifiers as basic components thereof.

A further object of the present invention resides in the provision of bistable devices which are inexpensive to construct and which exhibit considerable ruggedness.

A still further object of the present invention resides in the provision of bistable devices which can be made in relatively small sizes.

Still another object of the present invention resides in the provision of bistable devices utilizing magnetic amplifiers, which bistable devices have two stable output states distinguished by difference in the relative times at which periodic pulsed outputs occur.

Still another object of the present invention resides in the provision of bistable devices having predetermined input times for the reception of set and reset pulses respectively, the said bistable devices being selectively responsive to appropriate pulses applied during one or the other of the input times to give one or another output state, the said output states being distinguished in turn by a difference in the relative time at which periodic pulsed outputs occur.

In providing for the foregoing objects, the present invention utilizes magnetic amplifiers and further provides selective delays from the output to the input of the said magnetic amplifiers. These delays may be either passive or active in nature, and when they are in fact active they may be provided, as will be described, by further magnetic amplifiers. The operation of the devices is such that they produce outputs comprising a series of regularly spaced pulses, and the actual phase or time of occurrence of the said spaced pulse outputs may be varied by selective application of a pulse input to the said bistable device during predetermined set and reset input times.

The structure thus permits two characteristic pulse train outputs to be obtained, each of which represents one of the stable states of the bistable device, the said pulse trains being in turn distinguished from one another by a difference in the relative time of their occurrence with respect to a predetermined datum.

Before proceeding with a detailed description of my invention, several definitions of the subject matter to be discussed are advisable. In the practice of my invention, I utilize both complementing and non-complementing magnetic amplifiers. A complementing magnetic amplifier is, by definition, one which will give an output when no input is presented thereto, or on the contrary, one which gives no output when there is in fact an input. Again, by definition, a non-complementing amplifier is one which will give an output only when an input is presented thereto.

The several amplifiers comprising the bistable devices of my invention are energized by "power pulses." These pulses are preferably in the form of regularly occurring positive and negative going square waves. In the precise disposition of components, some amplifiers will be fed by "phase 1 power pulses" and this term merely refers to such positive and negative going square waves timed with respect to an arbitrary datum. Other of the amplifiers will utilize "phase 2 power pulses" and it is to be understood that this latter term again refers to pulses of the same form as phase 1 power pulses timed again with respect to the same arbitrary datum, but so displaced with respect to said datum that a positive going portion of a phase 1 power pulse will coincide with a negative going portion of a phase 2 power pulse and vice versa. Again, it will become apparent from the following description that the several power pulses cooperate with input pulses to selectively produce or inhibit an output from the magnetic amplifier concerned. These input pulses must occur during a negative going portion of the corresponding power pulse applied to the said amplifier (or during a positive going power pulse portion, if the power winding diode is reversely connected), and in this respect therefore when I speak of a "phase 1 input pulse" it is to be understood that this term refers to an input pulse capable of cooperating with a magnetic amplifier energized by phase 1 power pulses. Similarly, a "phase 2 input pulse" is one capable of cooperating with a magnetic amplifier energized by phase 2 power pulses. A phase 1 input pulse cannot effectively cooperate with a phase 2 power pulse, nor can a phase 2 input pulse effectively cooperate with a phase 1 power pulse.

The foregoing objects, advantages and operation of my invention will become more readily apparent from the following description and accompanying drawings, in which:

Figure 1 is an idealized hysteresis loop of a magnetic material which may preferably be employed in the cores of the magnetic amplifiers utilized in my invention.

Figure 2 is a schematic representation of a simple complementing amplifier of the magnetic type.

Figure 3 (A, B and C) are waveforms illustrating the operation of the complementing magnetic amplifier shown in Figure 2.

Figure 4 is a schematic representation of a simple non-complementing amplifier of the magnetic type.

Figure 5 (A, B and C) are waveforms illustrating the operation of the non-complementing magnetic amplifier shown in Figure 4.

Figure 6 is a logical representation of a simple phase responsive bistable device in accordance with one form of the present invention, and includes therein a legend descriptive of the logical representations employed.

Figure 7 (A through G inclusive) are waveforms illustrating the operation of the bistable device shown in Figure 6.

Figure 8 is a further logical representation of another phase responsive bistable device in accordance with the present invention and includes an additional legend describing the further logical representations employed.

Figure 9 (A through D inclusive) are waveforms illustrating the operation of the bistable device shown in Figure 8.

Figure 10 is another logical representation of a further bistable device in accordance with the present invention.

Figure 11:
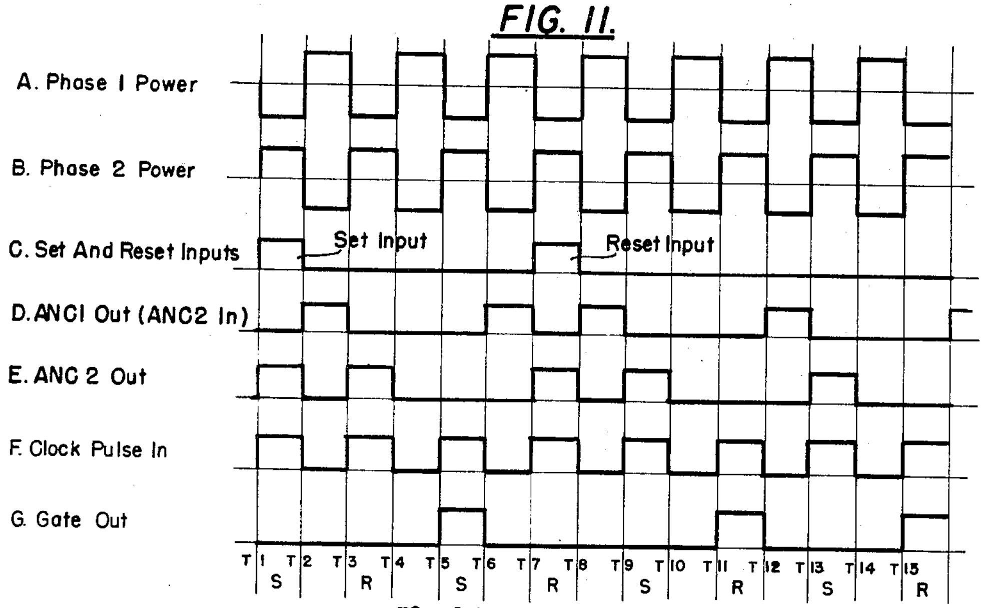
Figure 11 (A through G inclusive) are waveforms illustrating the operation of the bistable device shown in Figure 10.

Referring now to Figure 1, it will be seen that the magnetic amplifiers of my invention may preferably, but not necessarily, utilize magnetic cores exhibiting a substantially rectangular hysteresis loop. Such cores may be made of a variety of materials, among which are various types of ferrites and various kinds of magnetic tapes including Orthonik and 4–79 Moly-Permalloy. These materials may be given different heat treatments to effect different desired properties. In addition to the wide variety of materials applicable, the cores of the magnetic amplifiers to be discussed may be constructed in a number of different geometries including both closed and open paths. For example, cup-shaped cores, strips of material, or toroidal cores are possible. It must be emphasized that the present invention is not limited to any specific geometries of its cores, nor to any specific materials therefor; and the examples to be given are illustrative only.

In the following description, bar type cores have been utilized for ease of representation and for facility in showing winding directions. The bar type cores shown may in fact be considered to represent the end view of a toroidal core. Further, the following description refers to the use of materials having substantially rectangular hysteresis loops; this is again for ease of discussion. However, neither the precise core configuration nor the precise hysteretic character of core material is mandatory; and many variations will readily suggest themselves to those skilled in the art.

Returning now to the hysteresis loop shown in Figure 1, it will be noted that the curve exhibits several significant points of operation, namely, point 10 (+Br) which represents a point of plus remanence; the point 11 (+Bs) which represents plus saturation; the point 12 (—Br) which represents minus remanence; the point 13 (—Bs) which represents minus saturation; the point 14 which represents the beginning of the plus saturation region; and the point 15 which represents the beginning of the minus saturation region. Discussing for the moment the operation of the device utilizing a core which exhibits a hysteresis loop such as is shown in Figure 1, let us assume that a coil is wound on the said core. If we should initially assume that the core is at an operating point 10 (plus remanence), and if a voltage pulse is applied to the coil which produces in the said coil a current creating a magnetomotive force in a direction tending to increase the flux in the said core (i. e. in a direction of +H), the core will tend to be driven from point 10 (+Br) to point 11(+Bs). During this state of operation there is relatively little flux change through the said core coil and the coil therefore presents a relatively low impedance whereby energy fed to the said coil during this state of operation will pass readily therethrough and may be utilized to effect a usable output.

On the other hand, if the core should initially be at point 12 (—Br) prior to the application of the said +H pulse, upon application of such a pulse the core will tend to be driven from the said point 12 (—Br) to the region of plus saturation. The pulse magnitude should preferably be so selected that the core is driven only to the beginning of the plus saturation region, point 14. During this particular state of operation there is a very large flux change through the said core and the coil therefore exhibits a relatively high impedance to the applied pulse. As a result, substantially all the energy applied to the coil, when the core is initially at —Br, will be expended in "flipping" the core from point 12 to the region of plus saturation (preferably to point 14), and thence to point 10, with very little of this energy actually passing through the said coil to give a usable output. Thus, depending upon whether the core is initially at point 10 (+Br), or at point 12 (—Br), an applied pulse in the +H direction will be presented respectively with either a low impedance or a high impedance and will effect either a relatively large output or a relatively small output. These considerations are of great value in the construction of the magnetic amplifiers utilized in the present invention, such as are shown in Figures 2 and 4.

Referring now to Figures 2 and 3, it will be seen that a complementing magnetic amplifier, provided in accordance with the present invention, comprises a core 20, preferably but not necessarily, exhibiting a hysteresis loop similar to that discussed in reference to Figure 1. The core 20 bears two windings thereon, namely, a winding 21 which is termed the power or output winding, and a signal or input winding 22. One end of the power winding 21 is coupled to a diode D1, poled as shown, and the diode D1 is in turn connected to an input terminal 23 supplied with a train of positive and negative going power pulses such as is shown in Figure 3A. The power pulses shown preferably, but not necessarily, have a center value of "0" volts and exhibit excursions between +V and —V volts. Assuming now that the core is initially at plus remanence (point 10 of Figure 1), a positive going power pulse applied at terminal 23 during the time *t1* to *t2* will cause current to pass through the diode D1, through the relatively low impedance exhibited by power winding 21 and thence through diode D2 and load resistor RL, to ground. Because of the low impedance exhibited by coil 21, a substantial output pulse will therefore appear at the terminal 24 during the time *t1* to *t2*. At time *t2*, and in the absence of any signal input, the core will return to the operating point 10 (shown in Figure 1) and the next positive going power pulse applied during the time *t3* to *t4*, for instance, will again drive the core to plus saturation, again giving an output during this time *t3* to *t4*. Thus, in the absence of any other inputs, if the core 20 should initially be at plus remanence, successive positive going power pulses will cause successive outputs to appear at output terminal 24.

Let us now assume, however, that an input pulse is applied during the time $t4$ to $t5$, such as is shown in Figure 3C. This input pulse causes current to pass through the diode D3 and through coil 22 and, as will be noted from Figure 2, inasmuch as the said coil 22 is wound in a direction opposite to that of coil 21, the said input pulse will effect a —H magnetizing force on the core 20. Thus, during the time $t4$ to $t5$, the application of an input pulse, as described, will cause the core 20 to be flipped in a counter-clockwise direction from the plus remanence point to the region of the minus remanence point (point 10 to point 15, to point 12 of Figure 1) and at time $t5$ the core 20 will find itself at the operating point 12, —Br, preparatory to the reception of the next positive going power pulse applied during the time $t5$ to $t6$. This next positive going power pulse will thus find the coil 21 to present a relatively high impedance and, as a result, substantially all of the energy presented by the power pulse will be expended in flipping the core back to the region of point 10 (+Br), via point 14, rather than in producing a usable output. Thus, as will be seen from an examination of Figure 3, the application of an input pulse during the occurrence of a negative going portion of the applied power pulses will effectively prevent the output of a usable pulse during the next succeeding positive going power pulse. The system thus acts as a complementer.

While the foregoing discussion has described in essence the operation of a complementing magnetic amplifier in accordance with the present invention, several further design considerations should be noted. First of all, even though, during the time $t5$ to $t6$ for instance, the energy in the positive going power pulse is expended in merely flipping the core from —Br to +Br, a small output termed a sneak output may still appear across RL. Such sneak outputs are effectively suppressed by the combination of resistor R1 and diode D5 connected as shown in Figure 2. This suppression is effected by so choosing the magnitude of resistor R1 that a current flows through the said diode D5 and resistor R1 to a source of negative potential —V, which current is equal to or greater than the magnitude of the sneak pulse current to be suppressed. Because of the operation of diode D5 and resistor R1 therefore only outputs larger than that of the sneak output may appear at output 24.

Again, the passage of energy through power winding 21 due to the application of a positive going power pulse at the terminal 23 will cause a flux change to occur in the coil 21 as described, and this flux change will in turn tend to induce a voltage in the signal coil 22. This induced voltage is negative at the cathode of D3 and positive at the cathode of D4, and although the induced voltage is small, if the core 20 is at point 10 (+Br) when the positive going power pulse is applied, it is nevertheless necessary to prevent current from flowing in the signal winding 22 due to this small induced voltage. The combination of resistor R2 and diode D4 accomplishes this function by allowing the lower end of signal winding 22, connected to the junction of the said resistor R2 and diode D4, to attain the power pulse potential when the power pulse is positive. Since the base level of an input pulse, as applied through diode D3, is "0" volts, no current can now flow due to the small induced voltage discussed previously. Further, if the core 20 should initially be at —Br, upon application of a positive going power pulse, a relatively large flux change occurs in the core and a relatively large voltage will be induced in the lower winding 22. The blocking action of the R2—D4 circuit still prevents current from flowing in the said lower winding 22 if there are fewer turns on signal winding 22 than are on power winding 21. It is well known in the art that this relationship between the number of turns on the windings must exist if a voltage gain is to be produced by the amplifier.

Finally, it should be noted that when a power pulse, such as is shown in Figure 3A, is negative going, only a negligible current can flow in diode D1. In this respect it has been assumed that the back resistance of the several diodes shown is infinite and that the forward resistance is zero. While this is not strictly true, these assumptions are convenient and do not substantially affect the explanation. Even though no current flows through the diode D1 during the application of a negative going portion of the power pulse, current flows in the R2—D4 circuit, the magnitude of this current being approximately $$\frac{V}{R2}$$

This current serves to hold the end of signal winding 22 connected to the junction of resistor R2 and diode D4 at approximately ground potential, and as a result, signal inputs applied through the diode D3 during a negative going power pulse portion pass through the said diode D3, through winding 22, as previously discussed, to the junction of resistor R2 and diode D4, which junction is approximately at ground potential. It should further be noted that the current which flows as a result of an input pulse through diode D3 must produce sufficient magnetizing force to flip core 20 from plus remanence to minus remanence during the input pulse period. This value of current must not exceed the magnitude $$\frac{V}{R2}$$

but this condition is easily arranged by proper choice of resistor R2.

Summarizing the foregoing briefly, it will be seen that the circuitry of Figure 2 provides a complementing magnetic amplifier wherein outputs will appear from the said amplifier so long as no input signal is presented thereto during negative going portions of the power pulses applied. Such a complementing magnetic amplifier may be utilized as a portion of the bistable devices in accordance with several embodiments of the present invention. Before proceeding with the description of these bistable devices, however, let us examine the construction and operation of a non-complementing magnetic amplifier such as may be utilized in the present invention.

Referring now to the circuit shown in Figure 4, and making reference to the waveform diagrams of Figure 5 (A through C), it will be seen that a non-complementing amplifier in accordance with the present invention utilizes a magnetic core 40, again preferably exhibiting a hysteresis loop substantially the same as that shown in Figure 1. The core 40 again carries two windings thereon, namely, a power or output winding 41 and a signal or input winding 42. One end of the power winding 41 is coupled through a diode D6, poled as shown, to a source of positive and negative going power pulses such as is shown in Figure 5A. For the purposes of the following discussion, the power pulses are again assumed to have a center value of "0" volts and to exhibit excursions between plus and minus V volts. Assuming now that the core 40 is initially at —Br, point 12 of Figure 1, application of a positive going power pulse during the time $t1$ to $t2$, at power input terminal 43, will cause a current to flow through the diode D6 to winding 41 and thence through diode D9 and resistor RL to ground. Inasmuch as this energy is for the most part expended in flipping the core from —Br (point 12 of Figure 1) to +Br (point 10 of Figure 1), only a sneak output at best will appear across the load resistor RL, and this sneak output is again effectively suppressed by the combination of resistor R3 and diode D7, as was discussed in reference to Figure 2.

Summarizing the foregoing, therefore, during the time $t1$ to $t2$ the applied positive going power pulse merely succeeds in flipping the core from —Br to +Br, and due to the sneak suppression by diode D7 and resistor R3, no output will appear at terminal 44. During the period $t2$ to $t3$, a negative going power pulse is applied to terminal 43 and this applied pulse effectively causes diode D6 to cut off. During this period of time, a reverse current flows through the power winding 41 from ground through diode D7, through the said winding 41 and thence through resistor R4 to the source of negative potential —V. The value of this current is substantially $$\frac{V}{R4}$$

and R4 is so chosen that the current flow in the reverse direction through coil 41 is sufficient to flip the core during the time period $t2$ to $t3$ from +Br back to —Br in a counter-clockwise direction. Thus, at time $t3$, the core once more finds itself at the —Br operating point and a further positive going power pulse applied at terminal 43 during the time $t3$ to $t4$ will again merely flip the core to the +Br point with out effecting an output. Thus, in the absence of any other input signals the core is regularly flipped between —Br and +Br and back to —Br without there being any output.

If we should now assume that an input pulse, as shown in Figure 5C, should be applied to input terminal 45 during the time period $t4$ to $t5$, this input pulse will cause current to flow through the winding 42 via diode D8 and will subject the core 40 to a supplemental magnetizing force. As will become apparent from an examination of the winding directions shown in Figure 4, the magnetizing force effected by coil 42 during the time $t4$ to $t5$ is in a direction opposite to that effected by the reverse current flow through coil 41 during this same time period. The magnetizing effect of the said reverse current flow through winding 41 is thereby effectively nullified and, therefore, at the end of the $t4$ to $t5$ time period the core remains at the operating point +Br. Application of a further positive going power pulse during the time $t5$ to $t6$ will therefore cause a substantial output to appear across load resistor RL, and at output terminal 44. If no further input pulse should be applied during the time $t6$ to $t7$ the reverse current flow through winding 41 will again cause the core to flip back to the —Br point, no output will appear during the time $t7$ to $t8$, etc. Thus, the arrangement shown in Figure 4 permits an output to appear across resistor RL during the application of a positive going power pulse only if an input were applied at the terminal 45 during the next preceding negative going power pulse.

One other design consideration should be noted. Current flow through the winding 41 will, in the absence of other circumstances, establish flux changes tending to induce a voltage in the signal input coil 42. In order to protect the input circuit connected to diode D8 against any interference from current flowing in the power winding 41, the signal winding 42 is returned to a positive voltage +E, as shown, which positive voltage is equal and opposite in value to the voltage induced or generated in it by current flowing in the power winding 41 when reverse current flows through the said winding 41.

Having discussed the construction and operation of basic complementing and non-complementing magnetic amplifiers in accordance with the present invention, let us now examine circuits employing the said basic amplifiers to provide phase responsive bistable devices in accordance with the present invention.

Figure 6 discloses one such circuit, and it will be seen that such a circuit may comprise a non-complementing magnetic amplifier 50, the output of which is coupled through delay means 51 to one input of an inhibition type gate 52. Gate 52 is fed from a source 53 of regularly occurring clock pulses and the output of the said gate 52 is coupled through a buffer 54 to the input of non-complementing magnetic amplifier 50. A source of set and reset pulses 55 is further provided, and the said source 55 is coupled through a further buffer 56 to the input of magnetic amplifier 50. In the particular example shown in Figure 6, delay means 51 is passive in nature and may in fact comprise an inductor, a capacitor, an electromagnetic delay line or other appropriate passive networks capable of storing electrical energy. Magnetic amplifier 50 is energized by a source of regularly occurring power pulses of phase 1, in the particular example shown.

Referring now to Figure 7, the operation of Figure 6 will become readily apparent. It will be noted that the time periods $t1$ to $t2$, $t5$ to $t6$, $t9$ to $t10$, $t13$ to $t14$, etc. have been identified by "R," and this particular designation is meant to indicate those time periods during which an input pulse will cause the bistable device to assume what will be termed a reset output state. Similarly, the time periods $t3$ to $t4$, $t7$ to $t8$, $t11$ to $t12$, $t15$ to $t16$, etc. have been identified by "S"; and again this designation indicates those time periods during which the reception of an input pulse at the set-reset input 55 will cause the bistable device to assume a set output state. The terms "set output state" and "reset output state" are arbitrarily chosen for purposes of the present discussion. Examining the waveforms shown in Figure 7 is will be seen that a clock pulse input, which is positive going in nature, is fed to the gate 52 during the time period $t1$ to $t2$. For purposes of the present discussion, it is assumed that there is no output from the delay means 51 during this time period and therefore the gate 52 will produce an output (Figure 7B) during the time period $t1$ to $t2$ which output is coupled through buffer 54 to the input of non-complementing magnetic amplifier 50. Inasmuch as amplifier 50 is energized by phase 1 power pulses, the input thereto during the time period $t1$ to $t2$ acts as a phase 1 input and accordingly amplifier 50 produces an output pulse during the time period $t2$ to $t3$ (Figure 7E). This output pulse is coupled to delay means 51 and a further output pulse appears at the output of the said delay means 51 during the time period $t3$ to $t4$ (Figure 7F), which further output pulse is fed to the gate 52 at its terminal 57. The occurrence of a pulse at terminal 57 during the time period $t3$ to $t4$ inhibits the output of gate 52, and as a result there is no output from the gate 52 during the time period $t3$ to $t4$. Thus, no input is fed to the non-complementing magnetic amplifier 50 during the time period $t3$ to $t4$ and there is therefore no output from the said magnetic amplifier during the time period $t4$ to $t5$. This lack of output during the time period $t4$ to $t5$ in turn causes no inhibition pulse to be applied at the terminal 57 of gate 52 during the time period $t5$ to $t6$ and there is accordingly a further output from the gate 52 during the said time period $t5$ to $t6$, which further output acts as a still further phase 1 input to the magnetic amplifier 50, giving a still further pulsed output during the time period $t6$ to $t7$. Thus, in the absence of any input pulse from the set-reset source 55, a first train of pulses appears at the output 58, which train of pulses comprises a first pulse during the time period $t2$ to $t3$; no pulses during the next three succeeding time periods; another pulse during the time period $t6$ to $t7$; etc. As will be seen from an examination of Figure 7, this first output state would comprise a series of pulses appearing respectively during each time period subsequent to those termed "R" in the said Figure 7, and this particular output state is termed the reset stable state.

Let us assume, however, that an input pulse, termed a set input pulse is applied from terminal 55 during the time period $t7$ to $t8$ (Figure 7G). This set input pulse would be fed via buffer 56 to the input of non-complementing magnetic amplifier 50 and therefore causes an output to appear at output terminal 58 during the time period $t8$ to $t9$. This output is further coupled through delay means 51 to the terminal 57 of gate 52 causing inhibition of any output from the said gate 52 during the time period $t9$ to $t10$. As a result no output appears from non-complementing magnetic amplifier 50 during the time period $t10$ to $t11$; and the same cycle of operation discussed previously occurs. Thus, the occurrence of an input pulse during the time period $t7$ to $t8$, which is one of the time periods termed a set input time period, causes a new train of pulses to appear at the output 58 which new train of input pulses again comprises a series of pulses respectively separated from one another by three time periods, but which further series of pulsed outputs is shifted in time with respect to a datum such as $t1$. This further series of pulses may again be seen to comprise a pulse occurring during the time period next succeeding each of the "S" input time periods, and this latter state of pulsed output is termed the set stable state. Again, if a further pulse should be passed from the terminal 55 during a reset input time, such as $t13$ to $t14$ (Figure 7G), the bistable device will revert to its original or reset state and will commence producing pulsed outputs at $t14$ to $t15$, etc. (Figure 7E).

Thus, by way of summary, two stable output states are present for the circuit shown in Figure 6, each of which stable output states comprises a series of time separated pulsed outputs. The two states are distinguished by a difference in the relative time at which the periodic pulsed outputs occur and the two states have been termed arbitrarily the set state and the reset state. The device further is distinguished by the fact that it has predetermined input times termed respectively the set input times and the reset input times. Should the device be in a reset output stable state, the occurrence of a pulse during a reset input time will not affect its operation. On the other hand, should the device be in a reset output stable state, the occurrence of a pulse during a set input time period will cause the device to change to its set output stable state. A similar situation will prevail when the device is in fact in a set output stable state and once more the occurrence of a reset pulse during a reset time period will cause the device to revert to its reset output stable state.

Referring now to Figure 8, a further phase responsive bistable device in accordance with the present invention will be seen. This particular circuit comprises a complementing magnetic amplifier 60 energized by phase 1 power pulses. The output of the said amplifier 60 appears at an output terminal 61 and is further coupled to the input of delay means 62 which again may be passive in nature. The output of delay means 62 is again coupled through a buffer 63 to the input of complementing magnetic amplifier 60, and a source of set and reset input pulses may be selectively coupled via an input terminal 64 and a further buffer 65 to the input of complementing magnetic amplifier 60. The considerations of set and reset input times, discussed with reference to Figures 6 and 7, apply with equal force to Figures 8 and 9, as well as to the other subsequent figures in the case.

Referring now to Figure 9, the operation of the device shown in Figure 8 will become apparent. If we should assume that a set input pulse occurs during the time period $t1$ to $t2$, this input pulse acts as a phase 1 input to complementing magnetic amplifier 60 and inhibits any output therefrom during the time period $t2$ to $t3$. There is, accordingly, no input to delay means 62 during the said time period $t2$ to $t3$ and no output from delay means 62 during the time period $t3$ to $t4$. Complementing magnetic amplifier 60 therefore produces an output pulse during the time period $t4$ to $t5$, which output pulse appears at output terminal 61 and is also coupled to the input of delay means 62. The output pulse from delay means 62, appearing during the time period $t5$ to $t6$, is coupled via buffer 63 to the input of complementing magnetic amplifier 60 and prevents any output from the said amplifier during the time period $t6$ to $t7$. By a similar sequence of operations, and in the absence of any further input pulses, this lack of output during the time period $t6$ to $t7$ would result in no pulse appearing at the input of complementing magnetic amplifier 60 during the time period $t7$ to $t8$, and would therefore permit a further pulse output to appear under normal circumstances during the time period $t8$ to $t9$. Thus, the application of a set input pulse during a set input time period would cause a first regularly occurring train of output pulses to occur and, in the particular example shown, each of the pulses in fact would appear during the time periods following each of the "R" periods shown in Figure 9.

Let us assume, however, that an input pulse is coupled from the terminal 64 by buffer 65 to the input of amplifier 60 during the time period $t7$ to $t8$ (Figure 9B). This input pulse occurring during a time period termed a reset input time period prevents any output from occurring at output terminal 61 during the time period $t8$ to $t9$. Accordingly, no output is coupled to the input of delay means 62 during the said time period $t8$ to $t9$ and there is no output from the delay means 62 during the time period $t9$ to $t10$. Complementing magnetic amplifier 60 thus produces a pulse output during the time period $t10$ to $t11$ which follows an "S" time period, and a new stable state has thus been achieved representing a further train of pulses shifted in relative time with respect to the last mentioned train, and once more two stable states have been achieved. Each of these stable states again comprises a series of periodically occurring pulsed outputs, the two states being distinguished from one another by a difference in the relative time of occurrence of the said pulsed outputs.

Still another embodiment of the present invention will now be discussed with reference to Figures 10 and 11. In respect to the particular embodiment shown in Figure 10, it should be noted that the delay afforded by passive delay means 51 of Figure 6 can in fact be performed by a further magnetic amplifier, and therefore a variation of the structure shown in Figure 6 may take the form shown in Figure10. The fact that such a substitution can occur will be readily apparent by returning for a moment to our discussion with respect to Figures 4 and 5. Referring particularly to Figures 5B and C, it will be seen that an input pulse to a non-complementing magnetic amplifier during a given time period causes an output pulse to appear from such a non-complementing magnetic amplifier during the next succeeding time period. Thus, the action of the non-complementing magnetic amplifier is effectively that of an active delay means and this concept has been incorporated into the circuitry shown in Figure 10.

The phase responsive bistable device shown in Figure 10 comprises a first non-complementing magnetic amplifier 66, the output of which is fed to an output terminal 67 and also to the input of a further non-complementing magnetic amplifier 68. The output of magnetic amplifier 68 is fed to a terminal 69 of inhibition gate 70, and the said gate 70 in turn has a series of clock pulses fed thereto from an input 71. The output of gate 70 is further fed via a buffer 72 to the input of the first non-complementing magnetic amplifier 66. A source of set and reset input pulses 73 is provided which set and reset input pulses may be selectively fed via a buffer 74 to the input of the first non-complementing magnetic amplifier 66. Non-complementing magnetic amplifier 66 is energized by phase 1 power pulses while non-complementing magnetic amplifier 68 is energized by phase 2 power pulses.

Referring now to Figure 11, it will be seen that the operation of the circuit shown in Figure 10 is essentially the same as that of Figure 6, with the exception that an active delay is afforded by the magnetic amplifier 68 rather than the passive delay originally afforded by delay means 51. Referring to Figure 11, let us assume that a set input originally appears during a set input time period $t1$ to $t2$. Such a set input pulse is coupled via buffer 74 to the input of non-complement-magnetic amplifier 66 and acts as a phase 1 input thereto. Amplifier 66 thus produces a pulse output during the time period $t2$ to $t3$, and this pulse output acts as a phase 2 input to non-complementing magnetic amplifier 68. Amplifier 68 thus produces a further output pulse during the time period *t3* to *t4*, which further output pulse is coupled to the terminal 69 of inhibition gate 70 and serves to inhibit any output from the said gate 70 during the time period *t3* to *t4*. There is therefore no phase 1 input to the amplifier 66 during the time period *t3* to *t4*, and amplifier 66 accordingly produces no output during the time period *t4* to *t5*. This lack of output prevents any output from appearing from non-complementing magnetic amplifier 68 during the time period *t5* to *t6*, whereby gate 70 is not inhibited during this time period *t5* to *t6* and an input pulse from the clock pulses 71 is coupled via buffer 72 to the input of non-complementing magnetic amplifier 66 during the said period *t5* to *t6* and acts as a phase 1 input to the amplifier 66. A further output pulse thus appears at output terminal 67 during the time period *t6* to *t7* and the sequence of operation previously described would be repeated.

Again, therefore, the occurrence of a pulse during a set input pulse time period results in a first stable state being achieved which first stable state comprises a first series of pulses occurring respectively in the time periods next succeeding each set input time period. If we should now assume that a pulse appears via buffer 74 during the time period *t7* to *t8*, which is a reset input time period, this input pulse causes an output from non-complementing magnetic amplifier 66 during the time period *t8* to *t9* which output is fed to the input of further non-complementing magnetic amplifier 68 to produce a pulse therefrom during the period *t9* to *t10*. This latter output pulse from magnetic amplifier 68 inhibits an output from the gate 70 during the time period *t9* to *t10*, and the sequence of operations discussed previously is once more repeated. Thus, the occurrence of a pulse input during the reset time input period causes a new stable state to be achieved which new stable state comprises a further series of periodic pulses occurring respectively during the time periods next succeeding each reset time input period. Again, therefore, the circuit shown in Figure 10 comprises a phase responsive bistable device.

Figures 12, 14:
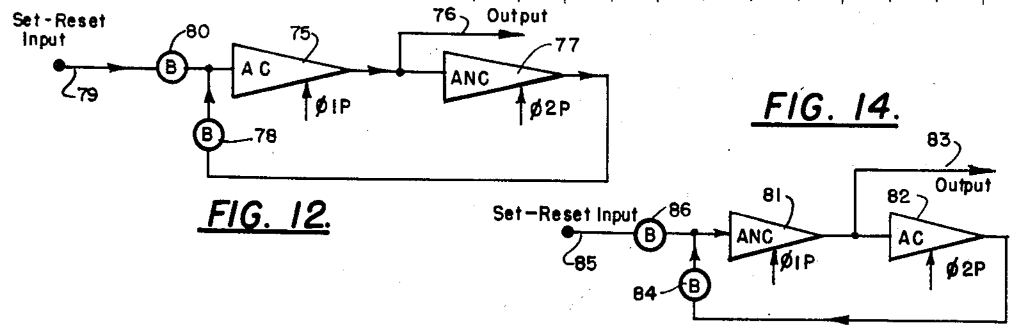
Figure 12 is a further logical representation of a phase responsive bistable device in accordance with another embodiment of the present invention.
Figure 14 is a logical representation of still another phase responsive bistable device constructed in accordance with the present invention.

Figure 12 depicts a further phase responsive bistable device in accordance with the present invention and again represents a circuit operating much like that of Figure 8, but utilizing a non-complementing magnetic amplifier in place of the passive delay 62 previously employed. Thus, the circuit of Figure 12 comprises a first complementing magnetic amplifier 75, the output of which is fed to an output terminal 76 and is also fed to the input of a non-complementing amplifier 77. Complementing amplifier 75 is energized by phase 1 power pulses and non-complementing magnetic amplifier 77 is energized by phase 2 power pulses. In accordance with the previous discussion, the non-complementing magnetic amplifier 77 acts as an active delay means and performs much the same function as did delay means 62 in Figure 8. The output of non-complementing magnetic amplifier 77 is fed via a buffer 78 to the input of complementing magnetic amplifier 75 and a source of set and reset input pulses is further coupled to an input terminal and thence via buffer 80 to the input of complementing magnetic amplifier 75.

Figure 13:
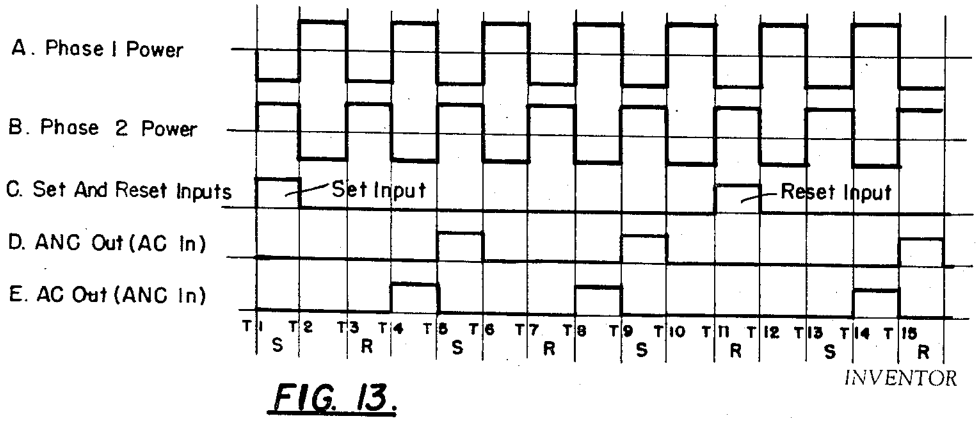
Figure 13 (A through E inclusive) are waveforms illustrating the operation of the bistable device shown in Figure 12.

Referring now to Figure 13, it will be seen that much the same considerations previously discussed with respect to Figure 8 are present in respect to the circuit of Figure 12. If a set input pulse should appear via terminal 79 and buffer 80 during the time period *t1* to *t2*, this set input pulse prevents any output from occurring from complementing magnetic amplifier 75 during the time period *t2* to *t3*. Thus, there is no phase 2 input to the non-complementing magnetic amplifier 77 during the time period *t2* to *t3* and therefore no output will appear from the said amplifier 77 during the time period *t3* to *t4*. Complementing magnetic amplifier 75 will accordingly provide an output during the time period *t4* to *t5* which output appears at terminal 76 and is further fed to the non-complementing mgnetic amplifier 77 and acts as a phase 2 input thereto. Non-complementing magnetic amplifier 77 accordingly produces an output pulse during the time period *t5* to *t6* which output is fed via buffer 78 to the input of complementing magnetic amplifier 75 and serves to inhibit any output from the said amplifier 75 during the time period *t6* to *t7*. Thus, the occurrence of a set input pulse during a set input time period results in a first staple state being achieved which first stable state comprises a first series of periodically occurring pulses appearing respectively during the time periods next succeeding each "R" input time period.

If a reset input pulse should be applied via buffer 80 during the time period *t11* to *t12* (Figure 13C), this reset input pulse prevents any output from appearing from complementing magnetic amplifier 75 during the time period *t12* to *t13*. There is therefore no phase 2 input to the non-complementing magnetic amplifier 77 during the time period *t12* to *t13* whereby no pulse output is coupled via buffer 78 from the output of amplifier 77 during the time period *t13* to *t14* and a pulsed output appears from the amplifier 75 at terminal 76 during the period *t14* to *t15*. Thus, once more a second stable state has been achieved, which stable state again comprises a series of periodically occurring pulses, this time respectively appearing during the time periods next succeeding each "S" input time period.

Figure 14 illustrates a phase responsive bistable device similar to that of Figure 12, but in which the positions of the complementing and non-complementing magnetic amplifiers have been reversed with respect to the output terminal. As will become apparent from the following discussion, this reversal of magnetic amplifiers does not affect the operation of the device other than to shift the relative times at which the set and reset output pulses appear. The circuit of Figure 14 comprises a non-complementing magnetic amplifier 81 the output of which is coupled to the input of a complementing magnetic amplifier 82 as well as to an output terminal 83. The output of complementing magnetic amplifier 82 is in turn fed via buffer 84 to the input of non-complementing magnetic amplifier 81 and a source of set and reset input pulses 85 is coupled via buffer 86 to the input of the said amplifier 81.

Figure 15:
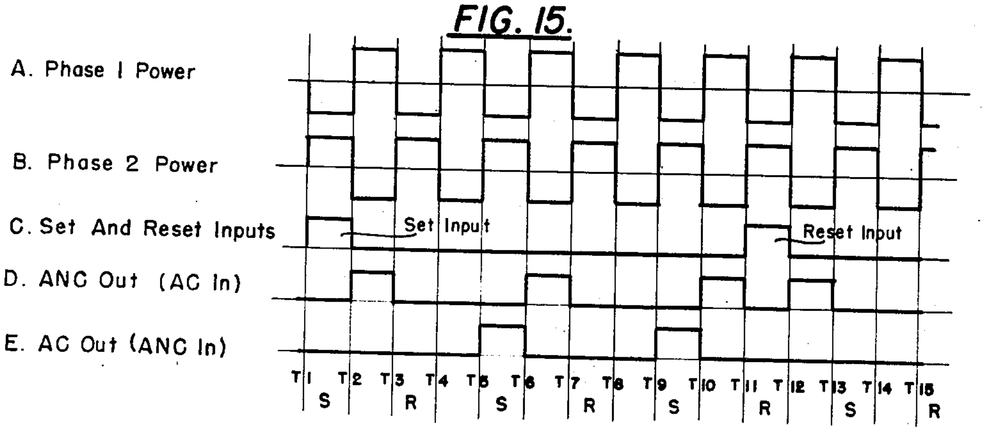
Figure 15 (A through E inclusive) are waveforms illustrating the operation of the bistable device shown in Figure 14.

Referring now to Figure 15, it will be seen that if a set input pulse should be applied via buffer 86 to the amplifier 81, during the time period *t1* to *t2*, amplifier 81 will produce an output pulse during the time period *t2* to *t3* (Figure 15D), which output pulse appears at output terminal 83 and is also fed to the input of complementing magnetic amplifier 82. Inasmuch as the pulse fed to the input of amplifier 82 acts as a phase 2 input thereto, complementing magnetic amplifier 82 produces no output during the time period *t3* to *t4* and therefore no output is fed via buffer 84 to the input of amplifier 81 during this time period. Amplifier 81 therefore produces no output during the time period *t4* to *t5* whereby complementing magnetic amplifier 82 does produce an output pulse during the period *t5* to *t6*. This output pulse is again fed via buffer 84 to the input of non-complementing magnetic amplifier 81 and acts as a phase 1 input thereto whereby a still further output appears at output terminal 83 during the time period *t6* to *t7*. The sequence of operations is repeated and a first stable state is achieved comprising a first series of pulses appearing respectively during the time periods subsequent to each of the set input time periods "S." Comparison of Figures 15D and 13D thus reveals that for a set input, the set output state has been shifted by the reversal of the amplifiers. Thus, the set output state of the circuit of Figure 14 comprises pulses appearing after each "S" input time period, while in the circuit of Figure 12 the set output condition comprises pulses appearing after each "R" input time period.

Returning to Figure 15C, it will be seen that the occurrence of a pulse via buffer 86 during the time period $t11$ to $t12$ causes the output of a pulse from amplifier 81 during the period $t12$ to $t13$, and the circuit thus has changed to a reset output condition in accordance with the principles discussed previously.

Figure 16:
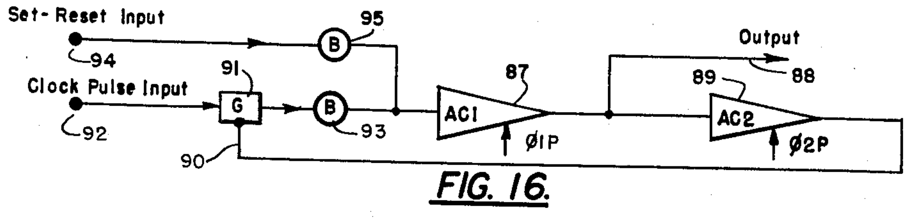
Figure 16 is a logical representation of a further bistable device constructed in accordance with the present invention.

Figure 16 comprises a still further phase responsive bistable device and the circuit of the said Figure 16 is derived from that of Figure 10, by noting that double complementing produces no change. Again, however, the circuit of Figure 16 does effect a change in the time of the outputs. This modification of my invention comprises a first complementing magnetic amplifier 87, the output of which is coupled to an output terminal 88 and also to the input of a further complementing magnetic amplifier 89. The output of complementing magnetic amplifier 89 is in turn coupled to a terminal 90 of an inhibition type gate 91 and a source of clock pulses 92 is also coupled to the said gate 91. The output of gate 91 is fed via buffer 93 to the input of complementing magnetic amplifier 87 and a source of set and reset input pulses 94 is also fed via buffer 95 to the input of the said complementing magnetic amplifier 87.

Figure 17:
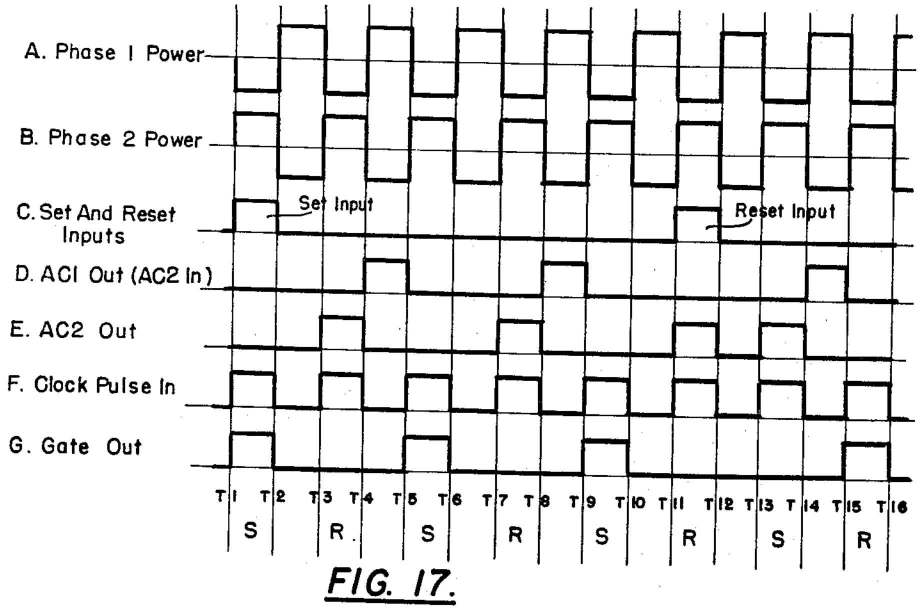
Figure 17 (A through G inclusive) are waveforms illustrating the operation of the bistable device shown in Figure 16.

Referring now to Figure 17, it will be seen that if a set input pulse should be coupled via buffer 95 to the input of complementing magnetic amplifier 87 during the time period $t1$ to $t2$, this input pulse inhibits any output from the said amplifier 87 during the time period $t2$ to $t3$. No output therefore appears at terminal 88 during the said time period $t2$ to $t3$, nor is any pulse fed to the input of complementing magnetic amplifier 89 during this time period. Amplifier 89 thus produces a pulse output during the time period $t3$ to $t4$ which pulse output is fed to terminal 90 of gate 91 to inhibit any output therefrom due to the input of clock pulses 92. Thus, during the time period $t3$ to $t4$ there is no input to complementing magnetic amplifier 87 and the said amplifier 87 thus produces a pulse output during the time period $t4$ to $t5$. A similar analysis will show that a further pulse output occurs from the amplifier 87 and is coupled to the output terminal 88 during the time period $t8$ to $t9$ and thus a first stable set output state has been achieved in which a train of pulses occurring respectively during the time periods following each "R" input time period results.

If a reset input (Figure 17C) should be coupled via buffer 95 to the input of amplifier 87 during the time period $t11$ to $t12$, the output state of the phase responsive bistable device will shift and the next output pulse will appear during the time period $t14$ to $t15$ (Figure 17D). Thus, upon the occurrence of a set input pulse a first train of pulses occurring respectively after each "R" input time period results, while for a reset input pulse a second stable state is effected comprising a further train of pulses occurring respectively after each "S" input time period. The circuit in short operates much like that of Figure 10, but the time of occurrence of the reset and set output states are reversed between the two circuits.

Figures 18, 19, 20:
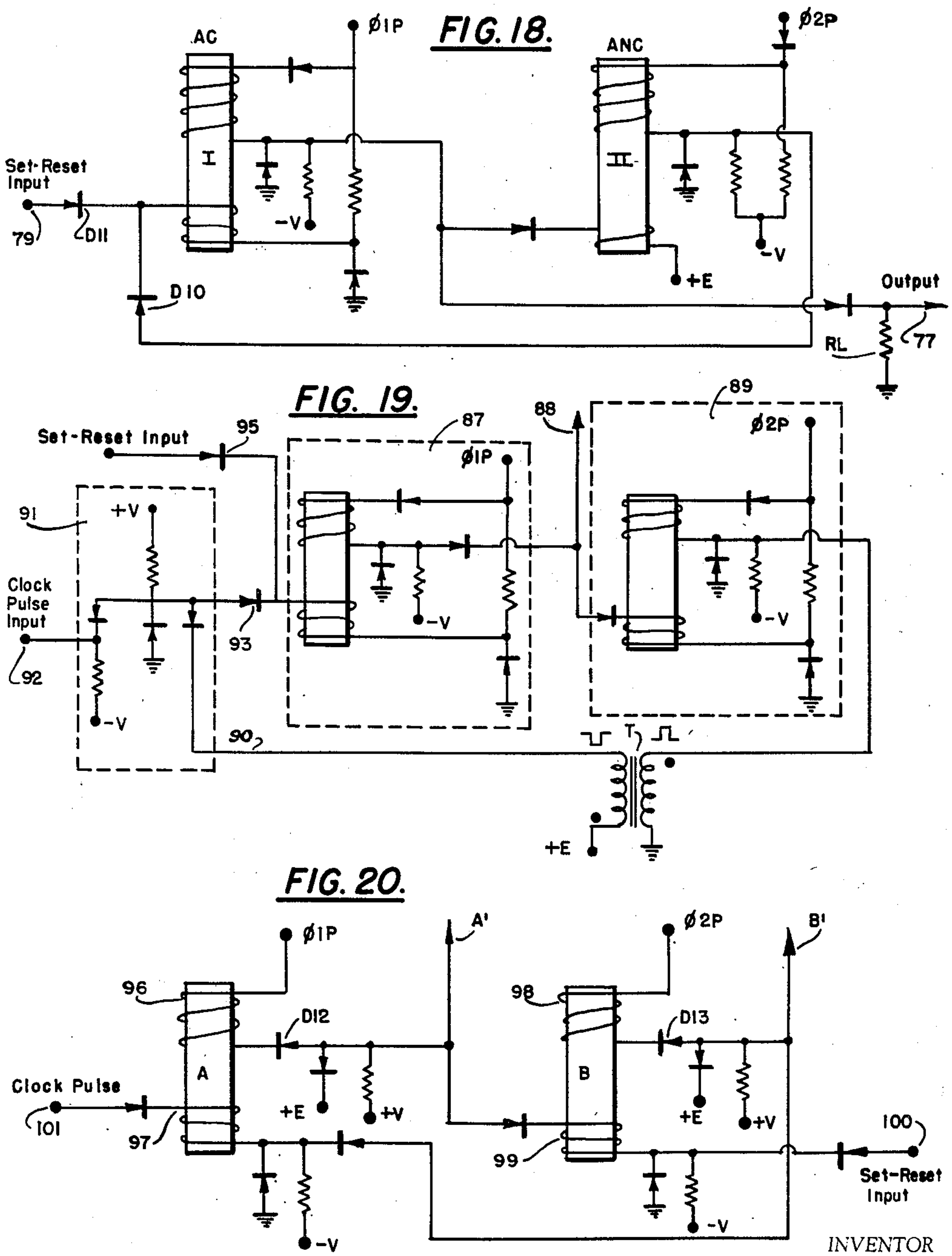
Figure 18 is a schematic diagram of a bistable device constructed in accordance with the present invention and corresponding to the logic of Figure 12.
Figure 19 is a further schematic diagram of a bistable device constructed in accordance with the present invention and corresponding to the logic of Figure 16.
Figure 20 is a still further schematic diagram of a modified form of bistable device constructed in accordance with the present invention.

Figure 18 comprises a schematic diagram illustrative of the logical representation of Figure 12 and is presented to show the manner in which the individual circuits of Figures 2 and 4 may be interconnected to form a circuit such as has been discussed in reference to Figure 12. The magnetic amplifier having core I corresponds to complementing magnetic amplifier 75, while the magnetic amplifier having magnetic core II corresponds to non-complementing magnetic amplifier 77. Diode D10 corresponds to buffer 78 while diode D11 corresponds to buffer 80. The various other connections and circuit components find their equivalent in Figures 2 and 4 and function in the manner discussed with respect thereto.

The other logical representations may similarly be converted to schematic diagrams by much the same techniques as are obvious in respect to Figure 18. Thus, referring to Figure 19, one possible schematic diagram in accordance with the logic of Figure 16 has been shown. The various individual components set forth in Figure 16 are identified by the blocked construction of Figure 19 and it need only be noted that a pulse transformer T is provided, as shown in Figure 19, between the output of amplifier 89 and the inhibition terminal 90 of gate 91. Pulse transformer T acts essentially as a polarity inverter and is provided to assure proper operation of gate 91 inasmuch as the gate 91 is of the inhibition type rather than of the permissive type.

It should be noted that in each of the embodiments of my invention discussed above, the average level of the output can be doubled by buffing two outputs together. Thus, in the circuits of Figures 10, 12 and 14, the outputs of the complementing and non-complementing amplifiers may be buffed together. This will be apparent for instance, with reference to the circuit of Figure 10, by an examination of Figure 11D and E, wherein for the set output state, for instance, it may be seen that amplifier 66 produces a pulse during the time period $t2$ to $t3$ while amplifier 68 produces a further pulse during the next succeeding time period $t3$ to $t4$, and the said two successive pulses may thus be buffed together to double the effective level of the combined output. Again, in the circuit of Figure 16, the output of the two complementing magnetic amplifiers 87 and 89 may be buffed together. Even in the circuits of Figures 6 and 8, which utilize but a single magnetic amplifier, the output of the said amplifier may be buffed together with that of the passive delay means thereby to raise the effective level of output. However, it should be noted that the usual technique of using a filter or some similar device to smooth the output and give a steady value is not applicable to the present invention.

While I have attempted to describe several particular embodiments of my invention, many variations will readily suggest themselves to those skilled in the art. In particular, the precise complementing and non-complementing magnetic amplifiers shown are merely illustrative and these amplifiers may in fact take a number of different forms which are all within the scope of the present invention. There are in fact at least three varieties each of the so-called series and parallel type magnetic amplifiers, these varieties being distinguished by one, two or three windings on the magnetic core. It is contemplated that each of these amplifiers may be utilized in place of the basic amplifiers, shown in Figures 2 and 4 of the instant case, in the construction of phase responsive bistable devices such as have been described in the several logical representations. Again, as has been discussed previously, either active or passive delays may be utilized in the practice of the invention, and many forms of each will suggest themselves to those skilled in the art.

Still further modifications will be suggested to those skilled in the art, in accordance with the principles discussed previously. Thus, for instance, referring to Figure 20, it will be seen that by proper disposition of the several components comprising a bistable device in accordance with the present invention, the inhibition type gate indicated to be present in various of the preceding embodiments may in fact be dispensed with. Thus, in Figure 20 a form of the present invention, operating much like the forms discussed previously, has been indicated. This modified form of the invention comprises two magnetic amplifiers having cores A and B respectively. Magnetic amplifier A carries a power winding 96 and a signal winding 97 thereon, while amplifier B carries a power winding 98 and a signal winding 99 thereon. Winding 96 is coupled to a first source of regularly occurring power pulses of phase 1, while the upper end of power winding 98 is coupled to a further source of regularly occurring power pulses of phase 2.

It will be noted that the diodes D12 and D13 coupled respectively to the lower ends of the power windings 96 and 98, are connected in a direction reverse to that of the diode D9 of Figure 4, for instance, and by this configuration it should be noted that the outputs appearing at points A′ and B′ are essentially negative going rather than positive going in respect to a datum. In practice, the power pulses fed to the upper ends of the power windings 96 and 98 preferably have a center value of substantially plus E volts, and are positive and negative going between potentials of zero and plus 2E volts. The output pulses appearing at the output points A′ and B′ will therefore be negative going substantially from a value of plus E volts to a value of zero volts. The set-reset input pulses are, as shown, coupled from a source 100 to the lower end of the signal winding 99, and the output A′ of the amplifier A is coupled to the upper end of the said signal winding 99. Similarly, the output B′ of the amplifier B is coupled to the lower end of the signal winding 97 while the source of clock pulses 101 is coupled to the upper end of the said signal winding 97. The operation of the device is similar to that described in reference to Figures 6, 7, 10 and 11; however, it should be noted that while in the embodiment of Figure 10, for instance, the output of amplifier 68 served to inhibit an output from a gate 70, the equivalent of this inhibition is effected in the embodiment of Figure 20 by causing the clock pulse input and the output of amplifier B to be fed to opposite ends of the signal winding 97 of the amplifier A whereby, when there is in fact an output pulse from the amplifier B, there is an effective nullification of signal current flowing in the signal winding 97 of the amplifier A.

The embodiment of Figure 20 is thus illustrative of several modifications which may be employed as shown in the said Figure 20 or which may be employed, where appropriate or desired, in the other embodiments of the present invention, described previously. In particular, it should be noted that by interconnecting the amplifier windings as shown, an inhibition gate need not be utilized, and further, that by reversal of the diodes connected to the power windings the polarity of output pulses obtained is similarly reversed. The arrangement shown in Figure 20 does not utilize any blocking pulses and the signal winding is therefore allowed to load the power winding to the extent permitted by the current source on the lower end of the signal winding. The sneak suppressors shown in Figure 20 operate as before except that a reverse current flow is effected through the said suppressors because of the different polarity considerations involved.

Having thus described my invention, I claim:

1. A phase responsive bistable device comprising a magnetic amplifier having an input and an output, feedback means coupling the output of said amplifier to the input thereof, said feedback means including delay means, a source of regularly occurring power pulses coupled to said amplifier, said amplifier being responsive to pulses occurring during first predetermined input times with respect to a preselected datum for producing at said output a first train of pulses periodically occurring during first predetermined output times with respect to said datum, said amplifier being further responsive to pulses occurring during second predetermined input times with respect to said datum for producing at said output a second train of pulses periodically occurring during second predetermined output times with respect to said datum.

2. The device of claim 1 in which said feedback means further includes an inhibition type gate interposed between the output of said delay means and the input of said magnetic amplifier, and a source of regularly occurring clock pulses coupled to said gate means.

3. The device of claim 2 in which said magnetic amplifier is a non-complementing magnetic amplifier.

4. The device of claim 1 in which said delay means is passive in nature.

5. The device of claim 1 in which said delay means comprises a further magnetic amplifier.

6. A bistable device comprising a magnetic amplifier having an output and an input, delay means for coupling energy between said output and said input, said amplifier including means responsive to an input pulse occurring during a first predetermined time interval for producing a first series of pulses at said output occurring respectively during first predetermined output times with respect to a given datum, said amplifier also including means responsive to an input pulse occurring during a second predetermined time interval for producing a second series of pulses at said output occurring respectively during second predetermined output times, different from said first output times, with respect to said datum.

7. The device of claim 6 in which said delay means comprises a further magnetic amplifier having a signal winding thereon, means coupling the output of said first mentioned amplifier to one end of said signal winding, and a source of regularly occurring clock pulses coupled to the other end of said signal winding.

8. The device of claim 6 in which said magnetic amplifier is a non-complementing amplifier, an inhibition type gate interposed between the output of said delay means and the input of said amplifier, and a source of regularly occurring clock pulses coupled to said gate.

9. The device of claim 8 in which said delay means comprises a further non-complementing magnetic amplifier.

10. The device of claim 6 in which said magnetic amplifier is a complementing amplifier.

11. The device of claim 10 in which said delay means comprises a non-complementing magnetic amplifier the input of which is coupled to the output of said complementing magnetic amplifier.

12. The device of claim 6 in which said magnetic amplifier and said delay means comprises two complementing magnetic amplifiers and an inhibition type gate each connected in series with one another in a closed ring configuration, and a source of regularly occurring clock pulses coupled to said gate.

13. The device of claim 6 in which said magnetic amplifier includes a core of magnetic material exhibiting a substantially rectangular hysteresis loop.

14. A bistable device comprising a magnetic amplifier, means for selectively applying an input pulse to said magnetic amplifier during one of a series of first predetermined input times whereby said magnetic amplifier produces a first series of output pulses occurring respectively during first predetermined output times, and means for selectively applying an input pulse to said magnetic amplifier during one of a series of second input times, different from said first input times, whereby said magnectic amplifier produces a second series of output pulses occurring respectively during second predetermined output times, different from said first output times.

References Cited in the file of this patent

UNITED STATES PATENTS

| | | |
|---|---|---|
| 1,695,908 | White | Dec. 18, 1928 |
| 2,116,372 | Weld | May 3, 1938 |
| 2,390,608 | Miller | Dec. 11, 1945 |